United States Patent [19]

Bengtsson

[11] Patent Number: 5,002,335
[45] Date of Patent: Mar. 26, 1991

[54] ELECTRICALLY HEATED VEHICLE SEAT AND A METHOD OF MANUFACTURING IT

[75] Inventor: Sten B. G. Bengtsson, Koppom, Sweden

[73] Assignee: Töcksfors Verkstads AB, Töcksfors, Sweden

[21] Appl. No.: 307,745

[22] Filed: Feb. 8, 1989

[30] Foreign Application Priority Data

Mar. 4, 1988 [SE] Sweden .................. 8800791

[51] Int. Cl.⁵ .............................................. A47C 7/72
[52] U.S. Cl. ................................... 297/180; 297/218; 297/219
[58] Field of Search ............... 297/180, 218, 219, 452; 5/421

[56] References Cited

U.S. PATENT DOCUMENTS 1,837,117 12/1931 Dunbar ........................... 5/421 X
4,558,905 12/1985 Natori ........................... 297/180 X
4,633,061 12/1986 Arikawa .

FOREIGN PATENT DOCUMENTS 312761 1/1974 Fed. Rep. of Germany .
3040888 5/1982 Fed. Rep. of Germany ...... 297/180
3425798 10/1985 Fed. Rep. of Germany .
3513909 10/1986 Fed. Rep. of Germany ...... 297/180
1364489 8/1974 United Kingdom .
1395999 5/1975 United Kingdom .

Primary Examiner—Peter R. Brown
Attorney, Agent, or Firm—Burns, Doane, Swecker & Mathis

[57] ABSTRACT

The disclosure relates to an electrically heated vehicle seat (1) with cover fabric portions (5,6), heating element (7) and padding (4) sewn together with a plurality of first seams (11-16 and 21-26) and second seams (10,19,20,29). The heating element has heating portions separated from each other by the first seams and communication portions which electrically connect to each other the heating portions which have been separated by the first seams. The first seams are sewn through the heating element without crossing the heating portions or communication portions. The second seams are not sewn through the heating element and neither are they sewn through the padding.

The disclosure also relates to a method of manufacturing an electrically heated vehicle seat, where cover fabric portions are sewn together with the heating element and padding using a plurality of seams. First seams are sewn through cover portions, heating element and padding, such that they do not cross the heating portions or communicaton portions in the heating element. Second seams are sewn solely through cover portions so that they cross or extend adjacent to the first seams in the vicinity of their ends.

4 Claims, 3 Drawing Sheets

ELECTRICALLY HEATED VEHICLE SEAT AND A METHOD OF MANUFACTURING IT

TECHNICAL FIELD

The present invention relates to the technical field of electrically heated vehicle seats and the manufacture of such. More specifically, the invention relates to an electrically heated vehicle seat, the covering fabric of which is sewn together with padding material and a heating element. The invention also relates to a method in manufacturing an electrically heated vehicle seat, where the covering fabric of the seat is sewn together with underlying padding and a heating element.

BACKGROUND ART

In passenger cars it is usual today that both the driver's seat and the passenger front seat have electrical heating elements. Several different types of element for car seats and several different placings in the seat and methods for attaching the element in the car seat are well-known to one skilled in the art. In car seats which have a carcass covered by a layer of upholstering material or padding and outside this layer a cover of leather, fabric or plastics material, this cover not being sewn together with the padding by a plurality of seams crossing each other, it is known to place a heating element between the cover and padding or corresponding upholstering material. Rapid heating of the seat cover can thus be obtained, which is regarded as positive by many motorists. In car seats where, for aesthetic and/or other reasons, the cover is sewn together with the padding with the aid of a plurality of crossing seams extending over a large part of the seat surface, it has not been possible to get the heating element between the covering and padding without risk of damage. In such car seats it is known to place the heating element under the padding. The covering fabric and padding can thus be sewn together in a desired manner for obtaining optimal travelling comfort, aesthetic appearance and other effects without risk of damaging the element during sewing. A disadvantage with this placing is, however, that heating the cover is delayed compared with if an element is placed between the cover and the padding, which can be felt to be negative by some motorists.

DISCLOSURE OF INVENTION

It has so far been a problem to make an electrically heated vehicle seat so that heating can be rapid in relation to the supplied power, while at the same time the seat can be cheap and simple to manufacture, when the cover is desired to be sewn together with an underlying layer of padding with seams which can extend over a large part of the seat area.

The invention has the object of solving the above-mentioned problems and enabling an electrically heated vehicle seat of the kind in question, which is comparatively simple and cheap to manufacture. The invention also has the object of enabling a method of manufacturing such a seat. What is distinguishing for a method and a vehicle seat in accordance with the invention, and particularly preferred embodiments thereof, is apparent from the independent and subordinate claims.

Somewhat simplified, it can be said that a method and a seat in accordance with the invention are based on the element being placed between the cover and the padding, that the element is manufactured with heating portions and communication portions, the positions and shapes of which are adjusted to the form and mutual positions of the seams, and in that certain but not all of the seams are sewn through the element.

Forming a vehicle seat and a method in accordance with the invention results in a combination of advantages individually known per se, which has not been possible earlier.

An advantage is that the cover can be heated comparatively rapidly in relation to supplied electric heating power. Another advantage is that prefabricated heating elements including both heating portions and communication portions can be utilized in the assembly and sewing procedure which makes manufactures more simple and rapid.

A further advantage is that the risk of the heating element being damaged by sewing will be very small, whereby rejection or repairs will be small in the course of manufacture, whereby the latter will be simpler and cheaper.

A still further advantage is that no attention to the element needs be paid in the design of the seams, and the seams can be given shapes and mutual positions which are practically optimum from the aesthetic aspect and/or comfort aspect and/or other aspects. Still further advantages with a method and a vehicle seat in accordance with the invention will be understood by one skilled in the art after studying the description of preferred embodiments.

BEST MODES FOR CARRYING OUT THE INVENTION

Figure 1:
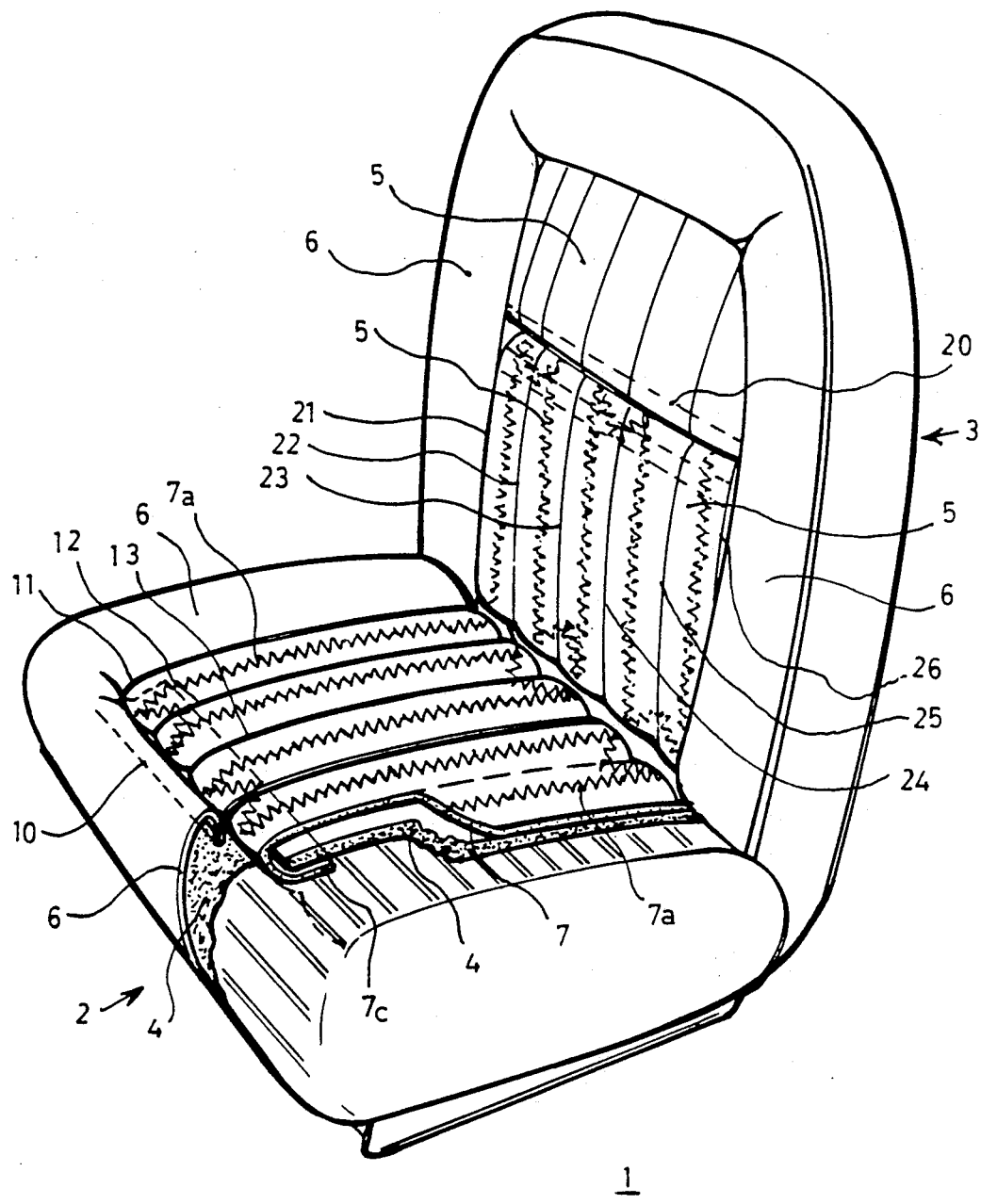
FIG. 1 illustrates the placing of a heating element and seams in relation to cover and padding in a preferred embodiment of an electrically heated vehicle seat in accordance with the invention.

Somewhat simplified, there is illustrated in FIG. 1 a vehicle seat 1 which may be a driver's seat or a passenger seat in a passenger car. The vehicle seat has a seat part 2 and a back support part 3. The seat part and back support part each include a carcass covered with padding 4 and covering fabric (cover). The carcass can be of a known type and can include springs. The construction of the carcass is no part of the invention and is not described further here. One not skilled in the art can find information with regard to carcasses in the patent literature, in workshop handbooks for cars, in spare parts catalogues etc.

The padding can include layers or portions of foamed rubber, foamed plastics or other resilient material with suitable elasticity which gives good sitting comfort. The cover can be of leather, fabric, plastics or other suitable material. Between the cover and the padding the seat part and the back support part have a heating element for electrically heating the vehicle seat, when required.

The seat cover comprises different portions which are sewn together with each other and layers of padding with the aid of a plurality of seams. The seams are long, and somewhat curved, due to the curving and dishing of the vehicle seats. A plurality of first seams 11-16 in the seat part extend substantially in essentially parallel planes, these planes being substantially right-angular to the back support part and oriented in the longitudinal direction of the vehicle. Corresponding first seams 21-26 in the back support part also extend substantially in parallel planes, these planes being at right angles to the seat part and oriented in the longitudinal direction of the vehicle. Two second seams 10 and 19 in the seat part extend substantially in essentially parallel planes, said planes being essentially at right angles to the planes of the first seams 11-16 and oriented in the transverse direction of the vehicle. Corresponding second seams 20 and 29 in the back support part extend substantially in essentially parallel planes, these planes being essentially right-angular to the planes of the first seams 21-26 and oriented in the transverse direction of the vehicle.

The first seams in the seat part have predetermined forms and positions in relation to each other. The second seams in the seat part have predetermined forms and positions in relation to each other and the first seams in the seat part. The corresponding applies for the seams in the back support part.

Figure 2:
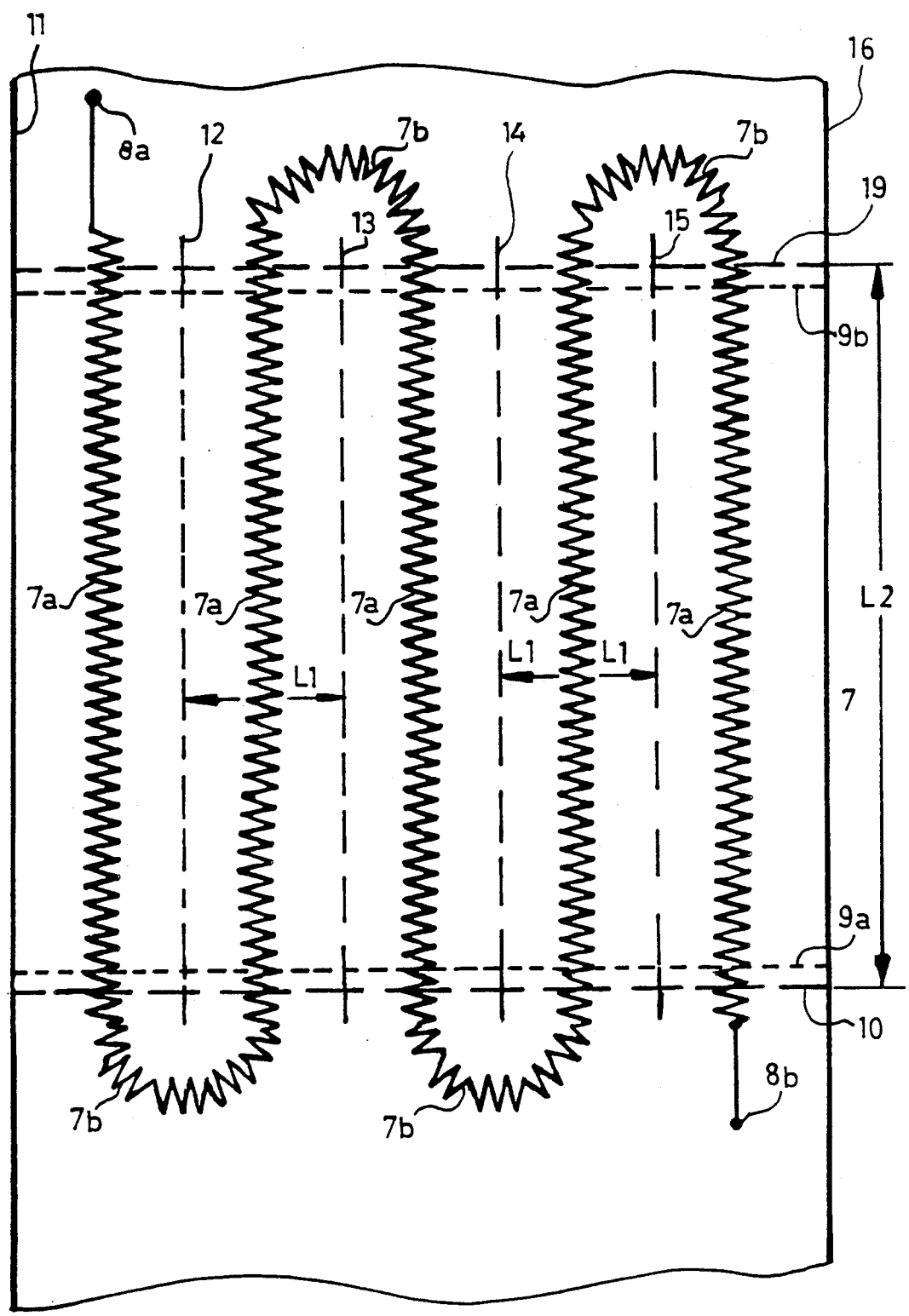
FIG. 2 illustrates the shape and mutual positions of details in a heating element in relation to the form and mutual positions of seams and padding seen from above and with the element opened out.

So as not to be damaged by the seams, the heating elements are manufactured with a plurality of heating portions and a plurality of communication portions, which have predetermined shapes and mutual positions adjusted to at least the forms and positions of the first seams. In FIG. 2 there is illustrated a heating element 7 with heating portions 7a and communication portions 7b. Its heating portions and communication portions comprise a plurality of thin electrical conductors which wander through a soft carrier material. Each conductor extends without interruption through all heating portions and all communication portions from a first connection means 8a to a second connection means 8b. The carrier material of the element has the same thickness and remaining mechanical properties in the areas for heating portions as well as those for the communication portions.

The forms and positions of the first seams are illustrated in FIG. 2 with dashed lines 11-16. The positions of the second seams are illustrated with dashed lines 10 and 19. It will be seen from FIG. 2 that the first seams can be sewn through the carrier material of the heating element so that they separate the heating portions from each other without crossing said portions or the communication portions. It can also be seen from the figure that the communication portions electrically connect the heating portions separated by the first seams to each other. The first seams and heating portions have substantially the same length. The length L1 between two juxtaposed first seams is several times shorter than the length of these first seams.

Also illustrated with dashed lines in FIG. 2 are the predetermined forms and positions of two second seams 10 and 19 in relation to the heating element. The form of the second seams is elongate and they cross the first seams at second distances L2 from each other, said second distances L2 being several times as great as the first distances L1. The second distances can be said to be approximately equally as long as the heating portions of the element.

Short-dashed lines 9a and 9b in FIG. 2 illustrate the predetermined forms and positions of two edges in a layer of padding 4 in relation to the heating element. Both edges 9a and 9b are between the second seams 10 and 19. The first seams 11-16 extend past the edges 9a and 9b and cross the second seams 10 and 19 in the vicinity of their beginning and end. In the vicinity of their beginning and end, the first seams 11-16 are therefore sewn solely through the first cover portions and not through the heating element 7. The first seams are sewn through the cover portions, heating element and padding 4 solely between the edges 9a and 9b.

In manufacturing a vehicle seat, the parts are first manufactured which are to be sewn together with the first and second seams. First covering fabric portions 5 which are to form the finished vehicle seat cover, at least in the area between the first and second seams on the seat part and back support part are stamped, cut or clipped to shape, depending on what the cover material is. Second cover material portions 6 which are to form the cover of the finished vehicle seat in the areas outside the first and second seams on the seat part and back support part are stamped, cut or clipped into shape as well. Foamed padding or other padding is stamped, cut or clipped into shape, with shapes adjusted to the desired final shape and solidity of the vehicle seat. The heating element is manufactured with heating portions and communication portions and including electrical conductors surrounded by carrier material.

The manufactured first cover portions and the heating element placed on a layer of padding and are sewn together using the first seams. Each first seam, in the vicinity of its beginning or end, is here sewn through the cover portion but not through the heating element or padding layer. Apart from the areas at the beginning and end of the respective seam, the first seams are sewn through the cover portion as well as heating element and padding material. Depending on the sewing technique used, the first seams and possible folds or overlapping between the cover portions can either be sewn one at a time or two or more at the same time, in a similar way as when there is no heating element between the cover portion and the padding layer.

The second seams are sewn after the first seams have been sewn. As will be seen from FIG. 2 these second seams are sewn outside the edges of the padding and therefore do not pass through it. Neither are they sewn through the heating element, but only through the first and second cover portions.

Figure 3:
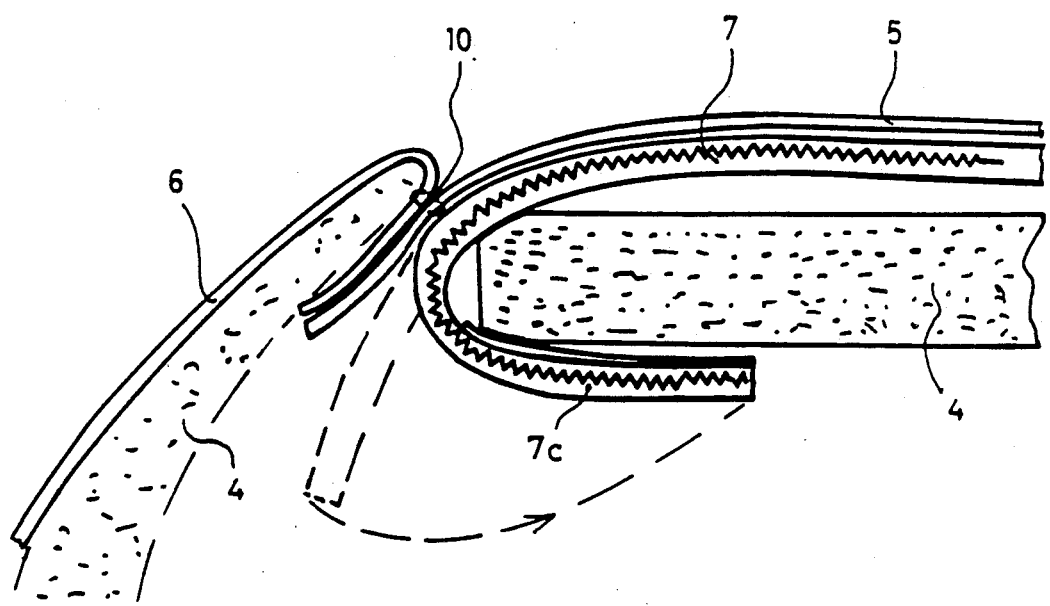
FIG. 3 is a section through cover, heating element and a layer of padding in a preferred embodiment of a vehicle seat in accordance with the invention.

The finished vehicle seat will have, as is apparent from FIGS. 1 and 3, a portion 7c of the heating element folded round the edge 9a of the padding layer and attached to the side of the layer facing away from the cover portion. This portion 7c includes at least parts of the communication portions of the heating element. To facilitate sewing the second seams, folding the portion 7c prefereably takes place before the second seams are sewn, in accordance with the arrow in FIG. 3. The actual fastening of the portion on the underside of the padding can but does not need, to take place after the second seams have been sewn.

When the first and second seams have been sewn, and possibly further seams have been sewn, the sewn-up cover, heating element and padding is taken over the seat part and back support part, respectively, optionally together with loose padding, and is fastened in place in a manner known per se. The padding which is not sewn together with the cover portions but which is to be between the carcass and the cover portion is put into place in a manner known per se.

By the method of manufacture in accordance with the invention, no first or second seam needs to be sewn through the heating element right across any heating portion or any communication portion. The communication portions which electrically connect the heating portions separated by the first seams pass between the edges 9a and 9b of the padding and the second seams 10, 19 in the seat. The seams solely through the carrier material in the heating element do not damage the electrical conductors in the heating portions, since the first seams do not cross the conductors in the heating portions or the communication portions.

A method and a vehicle seat in accordance with the invention is naturally not limited to the above-described embodiments illustrated in FIGS. 1-3, and can be modified within the scope of the claims. For example, it is conceivable that the first seams are not situated in parallel planes, but in planes which weakly diverge, e.g. so that the first distance L1 decreases somewhat closer to the back support part and the ends of the seat parts facing towards each other, and increases somewhat, further away from these parts. The first or the second means do not need to be substantially straight as seen from above, and it is conceivable to have them curved to a greater or less degree. The cover portions which form the cover fabric of the finished vehicle seat outside the area between the first and the second seams can comprise more or less separately cut and subsequently sewn-together pieces of material. The electrical conductors in a heating portion in a heating element can have a shape which more or less deviates from the regular wandering pattern illustrated in the figures. Further modifications will be understood by one skilled in the art after having read the claims.

The vehicle seat does not need to have the seat shape illustrated in FIG. 1, but can, for example, have the form of a bench and being intended for two or three persons sitting side by side.

I claim:

1. An electrically heated vehicle seat comprising a seat part covered by first and second cover portions and including an underlying padding and an intermediate heating element having elongated heating portions and communication portions which electrically connect the heating portions with one another, said first cover portion sewn together with the underlying padding and the intermediate heating element by means of a plurality of first seams which extend spaced from each other, and separate at least certain heating portions from each other without crossing the heating portions or communication portions, and said second cover portion sewn together with the first cover portion by means of a second seam that is sewn through the first and second cover portions without being sewn through the heating portions or communication portions of the heating element, said second seam extending adjacent to the beginning or end of the first seams.

2. A vehicle seat as claimed in claim 1, wherein certain of the first seams in the vicinity of their beginning or end are sewn through the first cover portion without being sewn through the heating element or the padding, and wherein the second seam is sewn such that it crosses at least certain of the first seams at their beginning or end where they are not sewn through the heating element or padding.

3. A vehicle seat as claimed in claim 2, wherein the first seams have an elongate form and extend at first distances from each other, two seams situated side by side each having a length which is several times as great as the first distance between them, a further second cover portion being sewn together with the first cover portion using a further second seam, said second seams crossing certain of the first seams at second distances from each other, said second distances being several times as great as the first distances between crossed first seams lying side by side, and wherein the heating portions are at least substantially as long as the second distances, the heating portions and communication portions being manufactured from material having the same electrical and mechanical properties.

4. A vehicle seat as claimed in claim 3, wherein a portion of the heating element, including at least parts of the communication portions, are folded round an edge of the padding in the vicinity of a second seam, and the folded portion is attached to the side of the padding which faces away from the first cover portion.

* * * * *